United States Patent [19]

Shigemori

[11] Patent Number: 4,817,069
[45] Date of Patent: Mar. 28, 1989

[54] TRACKING CONTROL SYSTEM OF AN OPTICAL PICK-UP

[75] Inventor: Toshihiro Shigemori, Yokohama, Japan

[73] Assignee: Ricoh Company, Ltd., Tokyo, Japan

[21] Appl. No.: 880,895

[22] Filed: Jul. 1, 1986

[30] Foreign Application Priority Data

Jul. 3, 1985 [JP] Japan .................................. 60-144486

[51] Int. Cl.$^4$ ............................................. G11B 21/08
[52] U.S. Cl. ....................................... 369/32; 369/43; 369/44; 360/72.2
[58] Field of Search ....................... 369/32, 44, 24, 33, 369/43, 45; 360/72.2, 69, 70, 72.1

[56] References Cited

U.S. PATENT DOCUMENTS

| | | | |
|---|---|---|---|
| 4,519,056 | 5/1985 | Kimoto et al. | 369/43 |
| 4,539,664 | 9/1985 | Deguchi et al. | 369/44 |
| 4,598,394 | 7/1986 | Nonaka | 369/44 |
| 4,608,676 | 8/1986 | Yoshida et al. | 369/111 |
| 4,616,354 | 10/1986 | Yoshida | 369/44 |
| 4,677,603 | 6/1987 | Kenjyo | 369/32 |
| 4,689,779 | 8/1987 | Hayashi et al. | 369/44 |
| 4,698,796 | 10/1987 | Kimura | 369/44 |
| 4,703,408 | 10/1987 | Yonezawa et al. | 369/44 |
| 4,731,771 | 3/1988 | Maeda et al. | 369/44 |
| 4,744,069 | 5/1988 | Sugiyama et al. | 369/32 |

Primary Examiner—William M. Shoop, Jr.
Assistant Examiner—Brian K. Young
Attorney, Agent, or Firm—Cooper & Dunham

[57] ABSTRACT

A tracking control system for controlling a relative positional relation between an optical pick-up and a rotating optical disc is provided. A tracking error signal is supplied to a low pass filter, to a lead phase compensating circuit and also to a zero cross comparator which supplies its output to a pulse generating circuit. During a normal tracking mode, in which the optical pick-up is maintained in alignment with a recording track of the rotating disc, an output from the low pass filter and an output from the lead phase compensating circuit are added to define a feed-back signal which is then supplied to the optical pick-up. On the other hand, during a track jump control mode, in which the optical pick-up is caused to jump to the next adjacent recording track, with the lead compensating circuit maintained in an inhibited state, an acceleration pulse is generated from the pulse generating circuit and then a deceleration pulse opposite in polarity is generated from the pulse generating circuit in response to an output from the zero cross comparator, wherein the output of the low pass filter is added with the acceleration and deceleration pulses to define a feed-back signal to be applied to the optical pick-up.

17 Claims, 4 Drawing Sheets

Fig.3a  OUTPUT FROM 22 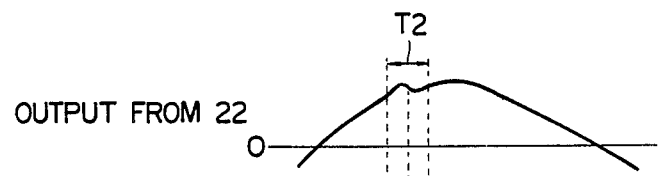
Fig.3b  OUTPUT FROM 24 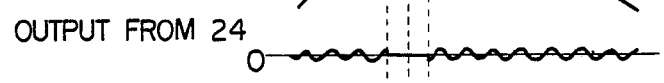
Fig.3c  DP 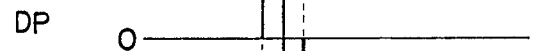
Fig.3d  SD 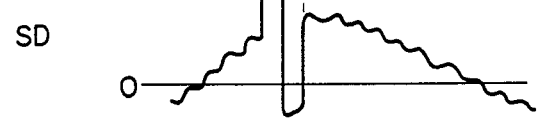

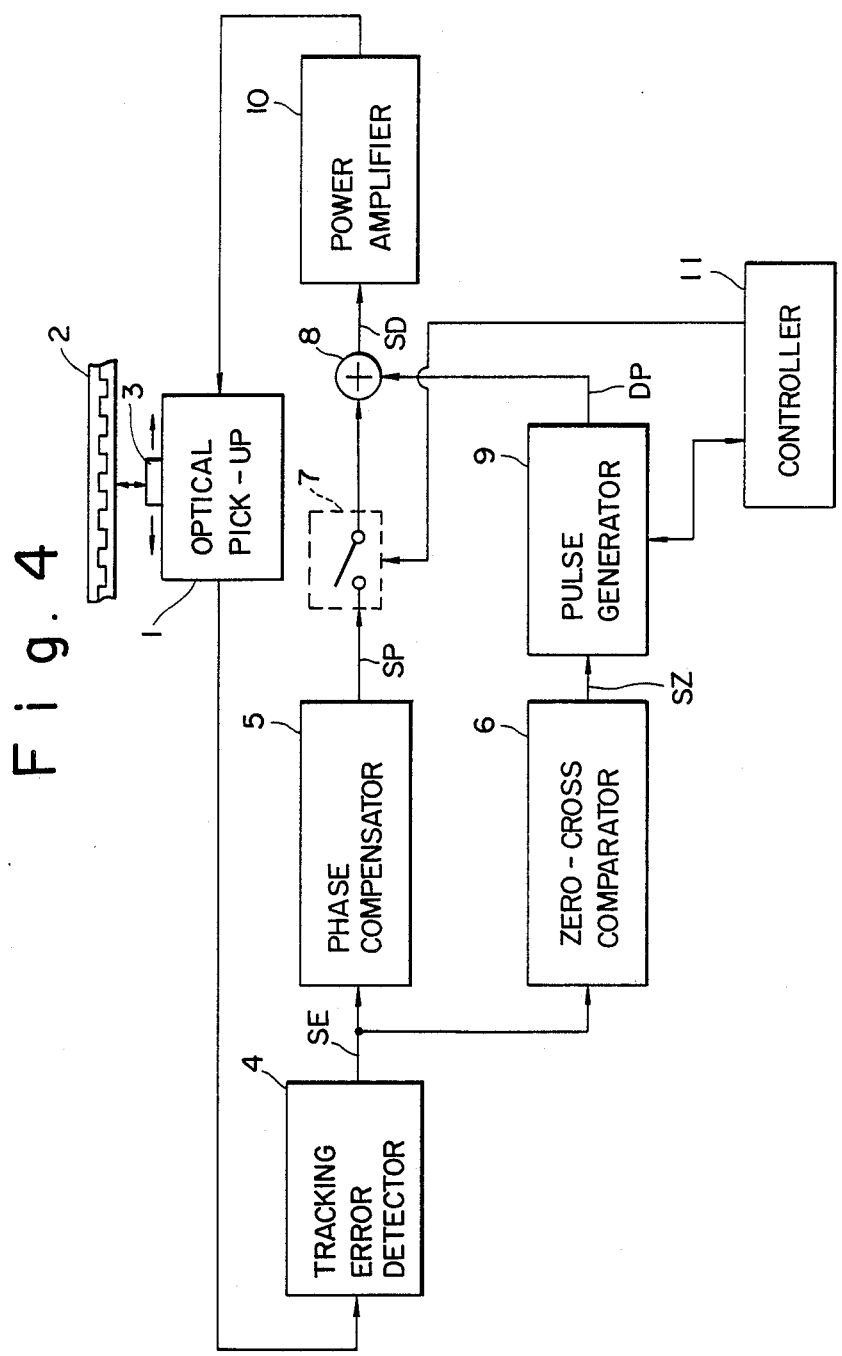

OUTPUT FROM 7

TRACKING CONTROL SYSTEM OF AN OPTICAL PICK-UP

BACKGROUND OF THE INVENTION

1. Field of the Invention

This invention generally relates to an optical disc recording/reproducing system, and, in particular, to a tracking control system of an optical pick-up for use in such an optical disc recording/reproducing system.

2. Description of the Prior Art

As an auxiliary storage device of a computer system, use has been widely made of a magnetic recording medium, such as magnetic tape and magnetic disc. Recently, it has been proposed to utilize an optical recording medium as an auxiliary storage device of a computer system so as to obtain an increased recording density.

For example, in an optical disc, in which an optical recording medium is formed in the shape of a disc, data is recorded by forming pits or small recesses of the order of 1 micron in diameter at a pitch or spacing of the order of 2 microns on a recording track on the surface of the disc by the application of a laser spot. The recording capacity is on the order of $10^{11}$ to $10^{12}$ bits for a disc of approximately 30 cm in diameter. Since an optical disc has such a large recording capacity, it is also proposed to use as an image file system for storing image information which is usually extremely large in the amount of information to be recorded.

Typically, a recording track is defined on a disc in the form of a pre-groove at the time of its manufacture, and the recording track or pre-groove is previously provided with various information, such as identification information of a recording region and sync signal, so as to properly control data to be stored. In one form of an optical disc, a plurality of such recording tracks are provided concentrically; whereas, in the other form, a single recording track is provided on an optical disc spirally.

In order to write and read data to and from an optical disc, provision is typically made of an optical pick-up which is movable radially with respect to the optical disc. Such an optical pick-up typically emits a laser beam toward the optical disc, and the reflected laser beam is received by the optical pick-up, whereby the received laser beam is analyzed to extract information recorded on the optical disc in the form of a series of pits. On the other hand, the laser beam applied to the optical disc from the optical pick-up may be modulated in accordance with information to be recorded, so that desired information may be recorded on the optical disc in the form of a series of pits. It is to be noted that such an optical pick-up is required to be properly aligned with a recording track for writing data thereon or reading data therefrom at the accuracy on the order of ±0.1 microns. For this purpose, there must be provided a tracking control system for allowing the optical pick-up to be properly aligned with a recording track of the optical disc.

SUMMARY OF THE INVENTION

It is therefore a primary object of the present invention to provide an improved tracking control system suitable for use in an optical disc recording and reproducing apparatus.

Another object of the present invention is to provide an improved tracking control system which allows an optical pick-up to be aligned with a recording track of an optical disc in an optical disc recording and reproducing apparatus at high accuracy.

A further object of the present invention is to provide an improved tracking control system which would help carry out a track jump control securely as well as reliably.

A still further object of the present invention is to provide an improved tracking control system which would help minimize a positioning error at the time of track jump control.

A still further object of the present invention is to provide an improved tracking control system reliable and stable in operation, and high in accuracy.

Other objects, advantages and novel features of the present invention will become apparent from the following detailed description of the invention when considered in conjunction with the accompanying drawings.

BRIEF DESCRIPTION OF THE DRAWINGS

FIGS. 3a through 3d are graphs useful for understanding the operation of main components of the structure shown in FIG. 1 during a track jump control mode;

FIG. 4 is a block diagram showing another tracking control system for sue in an optical disc recording and reproducing system;

FIGS. 7a through 7c are graphs useful for understanding the operation of main components of the structure shown in FIG. 4 during a track jump control mode.

DESCRIPTION OF THE PREFERRED EMBODIMENTS

FIG. 4 shows in block form a tracking control system suitable for use in positioning an optical pick-up with respect to a recording track of an optical disc via an optical disc recording and reproducing apparatus. As shown, the tracking control system includes an optical pick-up 1 which is provided with a focusing lens 3 for focusing a laser beam onto a surface of an optical disc 2. Although not shown specifically, it should be appreciated that the optical pick-up 1 is, typically, provided with a tracking actuator for moving the optical pick-up 1 with respect to the optical disc 2 in a radial direction thereof and a photodetector element or the like for receiving a reflected laser beam from the optical disc 2 for detecting a positioning error of a laser beam with respect to a recording track of the disc 2. Typically, the photodetector element has a split light-receiving surface and one example of such a split light-receiving surface has a pair of light-receiving surface sections which are arranged side-by-side, in which case a relative positional relationship between the laser beam and the recording track of the optical disc may be determined depending on the amount of laser beam received by each of the split light-receiving surface sections.

Figure 5:
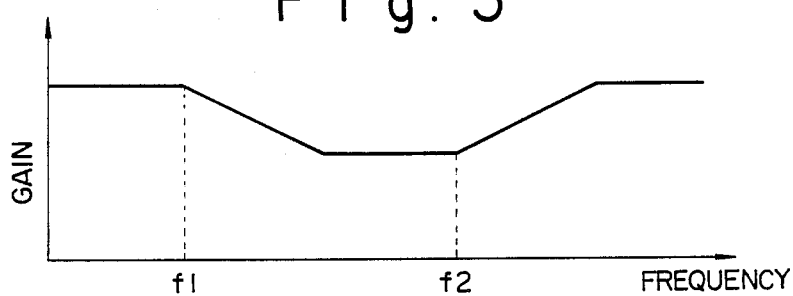
FIG. 5 is a graph showing a frequency characteristic of a phase compensation circuit provided in the structure shown in FIG. 4.

Output signals from the photodetector element are applied to a tracking error detecting circuit 4 which supplies a difference between its input signals as its output signal corresponding to a tracking error signal SE, which, in turn, is supplied to a phase compensation circuit 5 and also to a zero-cross comparator 6. The phase compensation circuit 5 carries out phase compensation for the gain of a tracking servo-loop in the tracking control system in a manner shown in FIG. 5, and it has a series-connected structure of a delay phase compensating element for correcting a control error (standing error) in a low frequency region from frequency f1 and a lead phase compensating element capable of carrying out compensation for an intermediate and high frequency regions from frequency f2 in order to secure stability of the tracking servo-loop. The phase compensation circuit 5 supplies its output signal SP to one input terminal of an adder 8 through a switch 7.

The zero-cross comparator 6 is provided to detect when the tracking error signal SE crosses the zero level, and it supplies its output signal SZ to a pulse generating circuit 9. The pulse generating circuit 9 generates a drive pulse DP of either polarity which is a drive signal for use in a track jump control for moving the optical pick-up 1 to an adjacent recording track, so that the drive pulse DP is supplied to a second input terminal of the adder 8. An output from the adder 8 is supplied to the tracking actoator of the optical pick-up 1 as a drive signal SD through a power amplifier 10. With this, the optical pick-up 1 is positioned in alignment with an intended recording track of the disc 2.

Also provided in the illustrated tracking control system is a controller 11 which disables the pulse generating circuit 9 and turns on (closes) the switch 7 during a normal tracking control period, wherein the output signal of the phase compensation circuit 5 is supplied to the tracking actuator of the optical pick-up 1 as its drive signal SD.

Figure 6A:
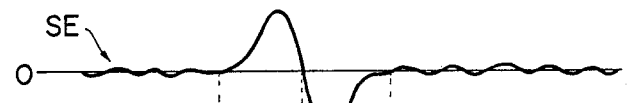
FIGS. 6a through 6c are graphs useful for explaining the operation of a track jump control mode.

During a track jump control mode, the controller 11 first turns off (opens) the switch 7 to set the tracking servo-loop in an open condition and causes the pulse generating circuit 9 to generate the drive pulse DP having a polarity corresponding to an intended recording track to which the optical pick-up 1 is about to jump. As shown in FIG. 6c, if a pulse P1 of positive polarity is output as the drive pulse DP, the tracking actuator of the optical pick-up 1 causes its lens 3 to move, for example, to the outer adjacent recording track in response to this drive pulse DP. Due to this movement of the lens 3, the position of irradiation of a laser beam at the surface of the disc 2 moves to the adjacent recording track, whereas the light receiving condition of the photodetector element of the optical pick-up 1 changes along with the movement of the laser beam. Accordingly, as shown in FIG. 6a, the error signal SE output from the tracking error detecting circuit 4 changes passing through a maximum value of one polarity and then another maximum value of the other polarity.

Figure 6B:
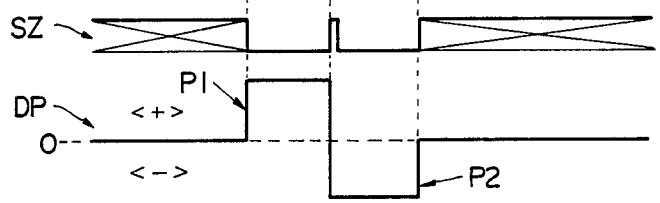
Figure 6C:
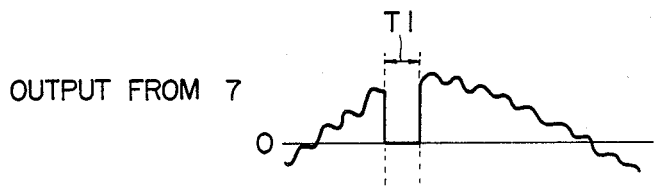

The zero-cross point of this error signal SE corresponds to a mid-point or center of the recording track, and at this timing, the zero-cross comparator 6 supplies a signal SZ as its output as shown in FIG. 6b. When the signal SZ is output in this manner, the pulse generating circuit 9 causes the drive pulse DP to be changed to a deceleration pulse P2 having the opposite polarity (negative) and a predetermined pulse width in synchronism with the rising edge of the signal SZ. Thus, the tracking actuator of the optical pick-up 1 is decelerated to be finally positioned in alignment with the next adjacent recording track located in the direction of movement of the optical pick-up 1 with respect to the disc 2. Immediately after having moved the lens 3 of the optical pick-up 1 to the adjacent recording track, the controller 11 causes the switch 7 to be turned on, thereby again establishing the tracking servo-loop, terminating the track jump control mode, and returning to the normal tracking control mode.

The optical disc 2 normally has a play in its radial direction due, for example, to a mounting error of the optical disc 2 to its drive shaft and eccentricity of the center of rotation of the disc 2. For this reason, the recording track of the disc 2 also has a discrepancy in position in the radial direction with respect to the center of rotation of the disc 2 when viewed from the optical pick-up 1. Such a positional discrepancy of the recording track may be suitably absorbed and the optical pick-up 1 may be positioned accurately by the effect of the tracking servo-loop during the normal tracking control mode; however, the track jump control mode is more susceptible to such a positional discrepancy of the recording track of the disc 2 because, during the track jump control mode, a positioning control operation is carried out only by the drive pulse DP in an open-loop control fashion with the tracking servo-loop maintained in the open condition as described above. Thus, if the positional discrepancy of the recording track of the disc 2 is relatively large, there is produced a relatively large positional error upon completion of track jump, so that there is a possibility that accurate positioning to the next adjacent recording track cannot be carried out reliably.

Figure 7A:
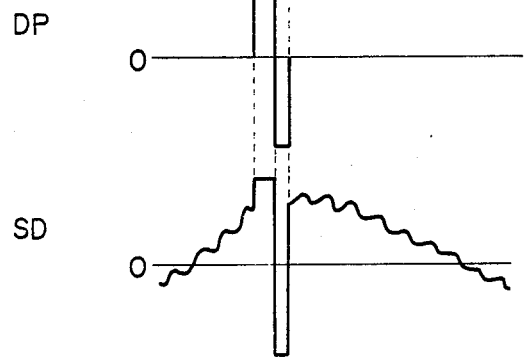

Described more in detail in this respect with reference to FIGS. 7a through 7c, during a time period in which the error signal SE is being output from the switch 7 corresponding to the positional discrepancy of the recording track as shown in FIG. 7a, if the track jump control is carried out during a time period T1, there is output a drive pulse DP as shown in FIG. 7b. However, as shown in FIG. 7c, since the drive signal SD does not have a component of error signal SE or a control amount corresponding to the positional discrepancy of the recording track during this time period T1, the positioning error is increased. Under the circumstances, in order to further enhance the accuracy and reliability in positioning the optical pick-up 1 with respect to the recording track of the disc 2, it is desired to provide a structure capable of minimizing the positioning error during the track jump control mode.

Figure 1:
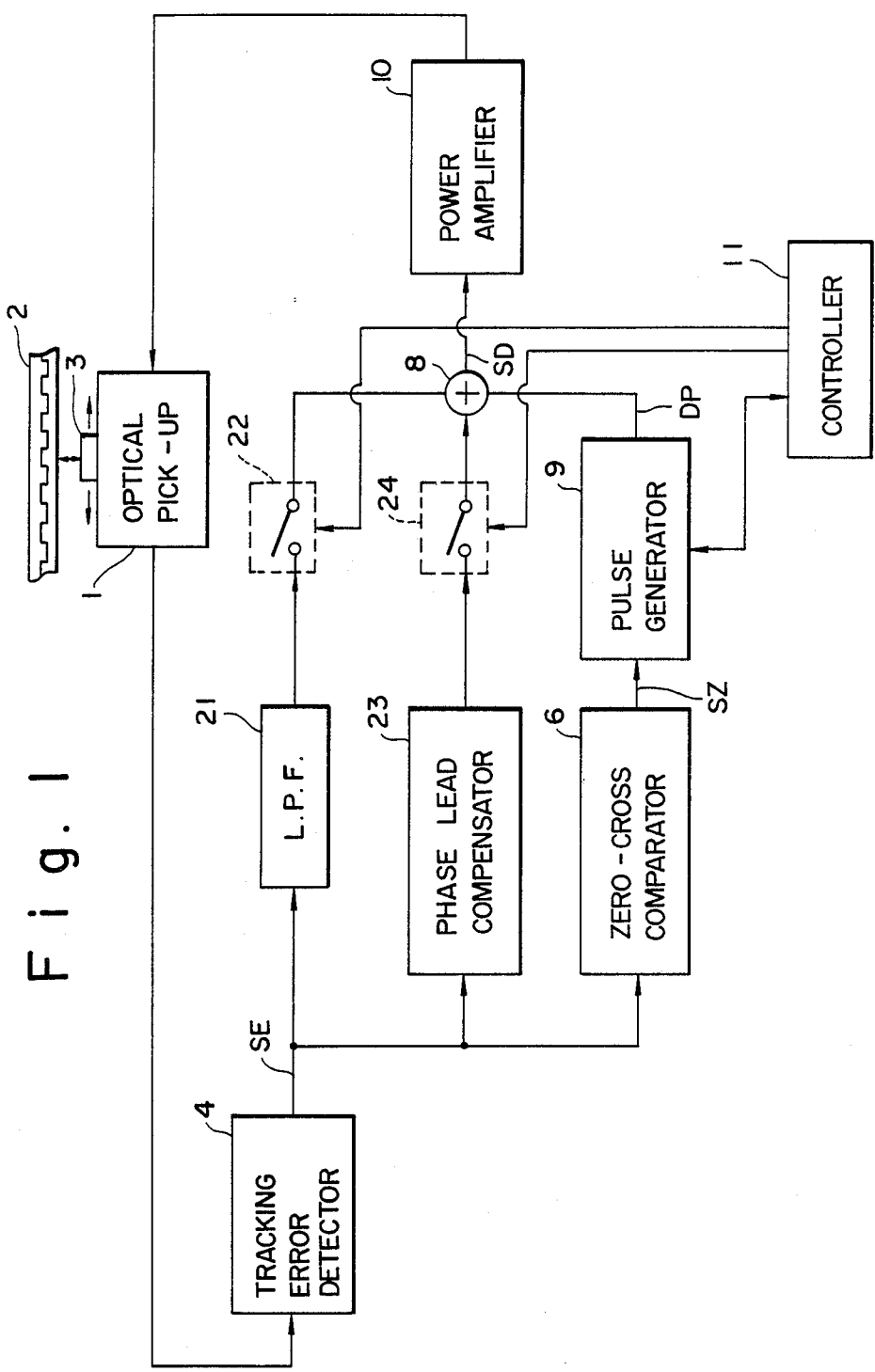
FIG. 1 is a block diagram showing a tracking control system for use in an optical disc recording and reproducing system constructed in accordance with one embodiment of the present invention.
Figure 2A:
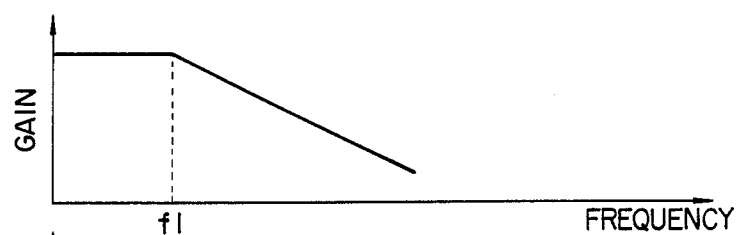
FIGS. 2a through 2c are graphs useful for understanding the operating characteristics of some of the components provided in the structure shown in FIG. 1.

FIG. 1 shows a tracking control system suitable for use in an optical disc recording and reproducing apparatus constructed in accordance with the preferred embodiment of the present invention capable of minimizing the positioning error even during the track jump control mode. It is to be noted that the tracking control system shown in FIG. 1 is structurally similar to the tracking control system shown in FIG. 4 in many respects, and, thus, identical elements are indicated by identical numerals, thereby omitting repetition of description of similar elements. The tracking control system of Fig. 1 is additionally provided with a low pass filter 21 connected to receive the tracking error signal SE output from the tracking error detecting circuit 4. The low pass filter 21 has a gain-frequency characteristic illustrated in FIG. 2a and extracts a low frequency component from the frequency f1 indicating the positional discrepancy of the recording track based on the eccentricity of the optical disc 2 in the radial direction. An output signal from the low pass filter 21 is supplied to a third input terminal of the adder 8 through the switch 22.

Figure 2B:
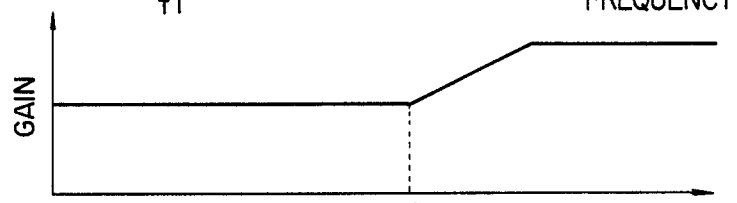
Figure 2C:
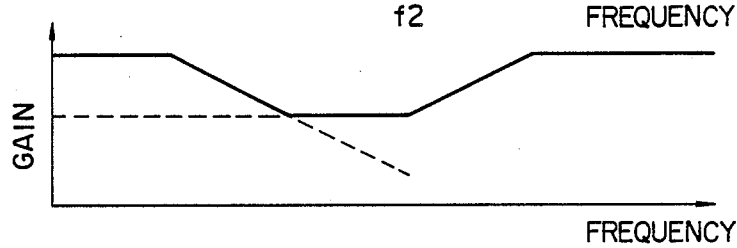

Also provided in the tracking control system of FIG. 1 is a lead phase compensating circuit 23 which has a gain-frequency characteristic shown in FIG. 2b and which produces an effect in the intermediate and high frequency regions from frequency f2 in order to secure the stability in operation of the present tracking servo-loop. The lead phase compensating circuit 23 supplies its output signal to the second input terminal of the adder 8 through a switch 24. To the first input terminal of the adder 8 is applied the drive pulse DP output from the pulse generating circuit 9, and an output from the adder 8 is supplied to the tracking actuator of the optical pick-up 1 through the power amplifier 10 as the drive signal SD. The controller 11 of the tracking control system of FIG. 1 maintains both of the switches 22 and 24 on during the normal tracking control mode, so that the phase compensation under the condition has a characteristic which is an algebraic sum of the gain-frequency characteristics of the low pass filter 21 and of the lead phase compensating circuit 23, as shown in FIG. 2c. As a result, during the normal tracking control mode, a phase compensation operation similar to that of the phase compensation circuit 5 of the previously described structure of FIG. 4 takes place. Accordingly, thanks to this tracking control operation, the optical pick-up 1 is maintained in position following the play or positional discrepancy of the recording track of the disc 2.

On the other hand, in the case of track jump control mode, the controller 11 keeps the switch 22 turned on but turns off the switch 24 turned, and a track jump control operation is carried out under these conditions. Thus, during the track jump control mode, a signal which is the sum of the output from the low pass filter 21 and the drive pulse DP output from the pulse generating circuit 9 is supplied as the drive signal SD. That is, as shown in FIGS. 3a through 3c, in the case where the track jump control is carried out during a time period T2, the output signal from the low pass filter 21 continues to be supplied to the adder 8 through the switch 22 even during this time period T2, so that the drive signal SD contains a control amount corresponding to the low frequency component of the play or positional discrepancy of the recording track. As a result, the positioning error to the adjacent track upon completion of the track jump control operation is minimized, to thereby carry out positioning of the optical pick-up 1 reliably as well as securely.

In this manner, in accordance with the above-described preferred embodiment of the present invention, the low frequency component of the play of positional discrepancy of the recording track is contained in a control amount as a feed-back amount during the track jump control mode, so that the play of positional discrepancy of the recording track is suitably corrected, to thereby carry out the track jump control reliably as well as securely.

In the case where the optical pick-up 1 is to be moved over a relatively long distance, e.g., moving the optical pick-up 1 from its stand-by or home position to a target recording track by traversing a number of recording tracks inbetween, the tracking servo-loop is not normally activated, and, thus, the controller 11 in this case turns off both of the switches 22 and 24.

As described in detail above, in accordance with the preferred embodiment of the present invention, the phase compensation unit in the tracking servo-loop is comprised of a low pass filter and a lead phase compensating circuit, which are connected in parallel, wherein, during the normal tracking control mode, the outputs from the low pass filter and the lead phase compensating circuit are added to produce a control amount; whereas, during the track jump control mode, the output from the lead phase compensating circuit is disabled, whereby the output form the low pass filter and the drive pulse for track jump are added to define a control amount. With this structure, it is possible to follow the play or positional discrepancy of the recording track even during the track jump control mode, so that the positioning error during the track jump control mode is minimized. In particular, since a majority of the play of the recording track based on the eccentricity of the optical disc is comprised of a low frequency component, the stability in track jump control may be enhanced significantly.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which isdefined by the appended claims.

What is claimed is:

1. A tracking control system for controlling a positional relationship between an optical pick-up and a rotating disc having formed thereon a recording track, comprising:

detecting means connected to said optical pick-up for detecting an error in tracking said recording track and producing a tracking error signal;

filtering means connected to receive said tracking error signal and to pass a predetermined band of frequency thereof and thereby produce an output;

phase compensating means connected to receive said tracking error signal and to compensate for the phase of said tracking error signal and produce an output;

comparator means connected to receive said tracking error signal and to produce an output signal indicative of whether or not said tracking error signal is above zero level;

pulse generating means connected to receive the output signal from said comparator means and to produce a drive pulse of a polarity corresponding to the direction of a desired movement of said optical pick-up relative to the disc;

adding means receiving said pulses;

a first switch means connected between said filtering means and said adding means;

a second switch means connected between said phase compensating means and said adding means; and control means operative during a first control mode to sum the output of said phase compensating means and the output of said filtering means to thereby produce a first feed-back signal supplied to said optical pick-up to cause said optical pick-up to be aligned with said recording track, and operative during a second control mode to inhibit the output from said phase compensating means and to produce an acceleration pulse having a polarity corresponding to the direction of a desired movement of said optical pick-up with respect to the disc, and to thereafter produce a deceleration pulse opposite in polarity to said acceleration pulse in response to an output from said comparator means indicating that said tracking error signal has crossed zero level, wherein the output from said filtering means, said acceleration pulse, and said deceleration pulse are added to define a second feed-back signal supplied to said optical pick-up to cause it to be aligned with another recording track, said control means being connected to both of said first and second switch means to control their operating conditions.

2. The system of claim 1 wherein said filtering means includes a low pass filter which allows a low frequency component of said tracking error signal to pass therethrough.

3. The system of claim 1 wherein said phase compensating means includes a lead phase compensating circuit for compensating the phase of said tracking error signal.

4. The system of claim 1 wherein said first control mode is a normal tracking mode, in which said optical pick-up is kept aligned with said recording track of said rotating disc, and said second control mode is a track jump control mode, in which said optical pick-up is caused to jump to a next adjacent recording track in a radial direction of said rotating disc.

5. The system of claim 4 wherein said recording track is provided on said rotating disc in a spiral form.

6. The system of claim 4 wherein a plurality of said recording tracks are provided on said rotating disc concentrically.

7. The system of claim 6 further comprising a power amplifier connected between said adding means and said optical pick-up.

8. An optical disc system in which a disc with radially spaced tracks rotates relative to an optical pick-up comprising:
a track error detector which detects an error in the pick-up's tracking of a selected track on the disc and produces a tracking error signal; and
a circuit connected to the track error detector and to the pick-up and operative in (i) a normal tracking mode, in which the circuit generates a first control signal as a function of the tracking error signal for application to the pick-up to maintain it in alignment with the selected track, and (ii) a track jump mode, in which the circuit generates a track jump signal related to the spacing between the selected track and another track and produces a second control signal which is a function both of said tracking error signal and of said track jump signal for application to the pick-up to move it from said selected track to said another track, said second control signal being the algebraic sum of said tracking error signal and said track jump signal.

9. An optical disc system as in claim 10 in which said circuit comprises a zero-cross comparator which receives said tracking error signal and produces a zero-cross signal related to the crossing of the center of a track of said pick-up, and a pulse generator which receives said zero-cross signal and generates said track jump signal, wherein the track jump signal comprises an acceleration pulse followed by a deceleratin pulse and the change from the acceleration to the deceleration pulse is timed by said zero-cross signal.

10. An optical disc system as in claim 9 in which said circuit includes a low-pass filter which filters the tracking error signal by suppressing the portion thereof which is above a first selected frequency relative to the portion below said first selected frequency, to thereby produce a filtered tracking error signal, wherein said circuit in said normal mode and in track jump mode generates said first and second control signals as respective functions of said filtered tracking error signal rather than of the unfiltered tracking error signal coming directly from the track error detector.

11. An optical disc system as in claim 10 in which said circuit includes a phase lead compensator which receives the unfiltered tracking error signal and compensates it by suppressing its portion below a second selected frequency relative to its portion above the second selected frequency, wherein the second selected frequency is higher than the first selected frequency, to thereby produce a compensated tracking error signal, and in which said circuit in the normal tracking mode is responsive to said compensated tracking error signal to make the first control signal a function both of the filtered tracking error signal and of the compensated tracking error signal.

12. An optical disc system as in claim 14 in which the radially spaced tracks on the disc comprise concentric tracks.

13. An optical disc system as in claim 11 in which the radially spaced tracks on the disc comprise portions of a spiral track.

14. An optical disc system as in claim 8 in which said circuit comprises a zero-cross comparator which receives said trcking error signal and produces a zero-cross signal related to the crossing of the center of a track by said pick-up, and a pulse generator which receives said zero-cross signal and generates said track jump signal, wherein the track jump signal comprises an acceleration pulse followed by a deceleration pulse and the change from the acceleration to the deceleration pulse is timed by said zero-cross signal.

15. An optical disc system as in claim 8 in which said circuit includes a low-pass filter which filters the tracking error signal by suppressing the portion thereof which is above a first selected frequency relative to the portion below said first selected frequency, to thereby produce a filtered tracking error signal, wherein said circuit in said normal mode and in track jump mode generates said first and second control signals as respective functions of said filtered tracking error signal rather than of the unfiltered tracking error signal coming directly from the track error detector.

16. An optical disc system as in claim 15 in which said circuit includes a phase lead compensator which receives the unfiltered tracking error signal and compensates it by suppressing its portion below a second selected frequency relative to its portion above the second selected frequency, wherein the second selected frequency is higher than the first selected frequency, to thereby produce a compensated tracking error signal, and in which said circuit in the normal tracking mode is responsive to said compensated tracking error signal to make the first control signal a function both of the filtered tracking error signal and of the compensated tracking error signal.

17. A method of operating an optical disc system in which a disc with radially spaced tracks rotates relative to an optical pick-up comprising:
detecting errors in the tracking of a selected track on the disc by the optical pick-up and producing a tracking error signal indicative of detected errors; and selectively operating the system in one of (i) a normal tracking mode, to generate a first control signal as a function of the tracking error signal for application to the pick-up to maintain it in alignment with the selected track, and (ii) a track jump mode, to generate a track jump signal related to the spacing between the selected track and another track and to produce a second control signal which is a function both of said tracking error signal and of said track jump signal for application to the pick-up to move it from said selected track to said another track, said second control signal being the algebraic sum of said tracking error signal and said track jump signal.

* * * * *